UNITED STATES PATENT OFFICE 2,101,645

INSECTICIDE AND FUNGICIDE

Robert A. Fulton and Willis Conard Fernelius, Columbus, Ohio, dedicated to the free use of the Public in the Territory of the United States of America No Drawing. Application May 25, 1937,
Serial No. 144,610

1 Claim. (Cl. 167—14)

(Granted under the act of March 3, 1883, as amended April 30, 1928; 370 O. G. 757)

This application is made under the act of March 3, 1883 as amended by the act of April 30, 1928, and the invention herein described, if patented, may be manufactured and used by or for the Government for governmental purposes without the payment to us of any royalty thereon.

We hereby dedicate the invention herein described to the free use of the Public in the territory of the United States of America to take effect upon the granting of the patent to us.

This invention relates to improvements in materials for destroying or checking the growth or multiplication of living organisms, whether plant or animal, which are economically injurious to man.

An object of the invention is to provide a material suitable for use as an insecticide and fungicide.

Another object of the invention is to provide a material which can be used in place of arsenicals for destroying insects without leaving a harmful residue on fruits and vegetables.

We have found that a sulfur compound made by the reaction of sulfur chlorides (preferably sulfur monochloride) and ammonia is effective in killing the larvae of the Mexican bean beetle; that this compound may be dusted or sprayed upon vegetation without injuring it; that this compound is more toxic than calcium arsenate and thiodiphenylamine as shown by extensive laboratory tests.

The sulfur compound comprised in our invention is sulfur nitride. This compound is made by the reaction of sulfur monochloride and ammonia under controlled conditions. The reaction is essentially as follows:

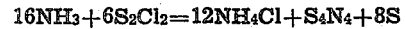

$$16NH_3 + 6S_2Cl_2 = 12NH_4Cl + S_4N_4 + 8S$$

Sulfur nitride occurs as orange-red crystals melting at 178°–180° centigrade. It is insoluble in water but soluble in a few organic solvents. The product of the above reaction may be reduced to suitable impalpable powder by grinding with a diluent such as talc or bentonite (1—1). This powder may be further diluted with a suitable carrier and applied as a dust or may be used directly in water as a spray. On account of the high specific gravity of the sulfur nitride, it is essential that the material be used with a suspension agent such as talc or bentonite.

The relative value of sulfur nitride as an insecticide in comparison with calcium arsenate, rotenone and thiodiphenylamine is shown by the following test:

1. In laboratory feeding tests with Mexican bean beetle larvae (*Epilachna varivestis* Muls.) sulfur nitride was one-third as toxic as pure rotenone and had twice the toxicity of calcium arsenate and thiodiphenylamine.

2. In laboratory tests at the dilution of 1–10,000 the material retarded the growth of common air spores (such as blue and red mold, *Rhizopus nigrisans* and *Penicillium sp.*).

Having thus described our invention, we claim:

A material for use in combatting economically harmful plant and animal organisms, containing sulfur nitride as its essential active ingredient.

ROBERT A. FULTON.
W. CONARD FERNELIUS.